Patented Nov. 23, 1948

2,454,283

UNITED STATES PATENT OFFICE 2,454,283

SEALING ELEMENT, INCLUDING A BINDER CONSISTING OF POLYISOBUTYLENE AND FACTICE

Ellis Gray King, Pittsburgh, Pa., assignor to Armstrong Cork Company, Lancaster, Pa., a corporation of Pennsylvania No Drawing. Application December 31, 1943,
Serial No. 516,590

10 Claims. (Cl. 260—23)

This invention relates to relatively tough, flexible and resilient compositions of matter and a method of preparing such compositions, and is primarily concerned with producing a composition of matter which is particularly suitable as a sealing element; for example, as a sealing element or liner for container closures. The relatively tough, flexible composition comprises polyisobutylene and factice with or without filler.

A suitable sealing element or liner is required in almost all types of container closures. These liners must be relatively tough and flexible so that a tight seal is formed between the closure and the lip of the container. The liner must be resilient and should possess "fight-back", that is, under load the sealing element is elastically deformed and it should exert a stress similar and opposite to the compressing force to maintain the seal. The liner must be substantially devoid of cold flow under the conditions of use so that the elastic forces are not dissipated, must be impervious to gas even at relatively high temperatures, must retain gas under pressure for an indefinite period of time, and must not impart taste or odor to the container contents. Further, the sealing element should be sufficiently free from tack so that portions thereof will not adhere to the container lip when the closure is removed.

Certain compositions have been proposed heretofore as materials suitable for use in container closures as liners. For example, rubber and rubber containing compositions have been used but rubber possesses a characteristic odor and taste which is quite often highly undesirable. Synthetic rubbers have been used, but these also tend to impart an undesirable taste and odor to the container contents which is objectionable.

Within the past few years there has been developed a compound essentially consisting of a polymer of isobutylene which may be prepared by polymerizing isobutylene in the presence of a Friedel-Crafts catalylst such as aluminum chloride, boron trifluoride, and the like at temperatures of from about 0° F. to —100° F. or lower. Polymerized isobutylene is available on the market under the trade-mark "Vistanex." Polyisobutylene tends to flow even under slight pressure and is in general quite tacky and is therefore unsuitable as a sealing element.

I have discovered a flexible, compressible, tough, and substantially tack-free composition which has considerable "fight-back" and is particularly adaptable for use as a closure lining material. This composition comprises polyisobutylene and factice in certain amounts and may or may not contain filler.

I have discovered that a suitable sealing element may be prepared when the factice and polyisobutylene are mixed in such proportions that the factice comprises about 80% to 65% by weight of the total amount of factice and polyisobutylene though I prefer to employ the factice in an amount equal to from about 77% to 68% by weight of the total. In these proportions the factice reduces the cold flow characteristics of the polyisobutylene so that the composition is satisfactory for sealing carbonated beverages at higher than the usual degree of carbonation and for indefinite periods. If an amount of factice larger than 80% of the total amount of factice and polyisobutylene is used, the resultant material is somewhat weak and tends to crack so that it is unfit as a sealing element, especially as a liner for crown closures. A decrease in the amount of factice below that set forth above results in a product which is relatively soft and has a tendency to flow at room temperature and to be tacky.

Factice is well-known and is a gel of relatively low tensile strength obtained by vulcanizing raw, oxidized or polymerized unsaturated glycerides of the drying or semi-drying oils, hereinafter referred to as siccative oils. Any suitable vulcanizing agent such as sulphur, sulphur chloride, or the like may be used with an oil such as linseed oil, soya bean oil, castor oil, rapeseed oil, perilla oil, cottonseed oil, various fish oils, and mixtures of such oils or the like.

Fillers may or may not be used and in general, too great an increase in the amount of filler tends to reduce the rubber-like characteristics of the composition and tends to reduce the amount of factice which can be used. Any suitable filler may be used and I have found the fillers and pigments such as asbestine, ground walnut shells, potter's flint, "Silene," talc, slate, carbon black, iron oxide, titanium dioxide and the like to be highly satisfactory. The amount of filler will depend to a certain extent upon the proportion of factice to polyisobutylene and upon the particular conditions of service for the sealing element.

I employ a medium molecular weight polyisobutylene in the preparation of my composition. Such polymers have an average molecular weight of about 70,000 to 200,000.

The following detailed examples, in which all parts and percentages are by weight, serve to illustrate my invention:

*Example 1*

A sealing composition suitable as a liner for closures was prepared as follows:

| | Percent |
|---|---|
| Polyisobutylene having an average molecular weight of about 150,000 | 25 |
| Factice | 75 |

This factice was sold by the Stamford Rubber Supply Company of Stamford, Connecticut, under their designation, "Amberex Type R."

These ingredients were intimately mixed on a mill at room temperature and then sheeted to a thickness of about 0.062″. This material, when tested in a crown closure on a liquid-filled container containing 4.6 volumes of $CO_2$ gas dissolved in the liquid, retained the gas even after pasteurization at 150° F.

The above ingredients may be mixed on hot rolls at a temperature of about 70° to 100° C. or higher, or may be combined by first mixing the ingredients on a cold or slightly warm mill, and then placing the mixture in a mold and applying both heat and pressure. For example, a temperature of about 147° C. for about 30 minutes was satisfactory when molding.

Some of the other specific formulations which I have found to give satisfactory results are as follows:

*Example 2*

| | Parts |
|---|---|
| Polyisobutylene (100,000 to 200,000 average molecular weight) | 24 |
| Factice | 66 |
| Asbestine | 10 |

*Example 3*

| | Parts |
|---|---|
| Polyisobutylene (100,000 to 200,000 average molecular weight) | 24 |
| Factice | 66 |
| Potter's flint | 10 |

*Example 4*

| | Per cent |
|---|---|
| Polyisobutylene (100,000 to 200,000 average molecular weight) | 28 |
| Factice | 70 |
| Iron oxide | 2 |

*Example 5*

| | Per cent |
|---|---|
| Polyisobutylene (100,000 to 200,000 average molecular weight) | 35 |
| Factice | 65 |

The sealing element of Example 2 proved especially satisfactory.

The mixture of Example 5 was mixed and sheeted onto a pulpboard backing. Other backing materials may be used and the products of the other examples may be used with a backing. In general, I prefer to use pulpboard or other backing material with the compositions which are relatively high in polyisobutylene as the backing aids in overcoming any tendency for the composition to flow under pressures such as may be encountered with crown closures.

I have also discovered that an improved sealing element is obtained when the fillers, if any, are first thoroughly mixed with the polyisobutylene at an elevated temperature and then the factice is combined with this mixture. The sealing element not only forms a better seal but tends to be less tacky. For example, I have discovered that a better sealing element is formed if when combining the ingredients set forth under Example 2, the asbestine is first milled with the polyisobutylene on steam heated rolls for about 5 to 20 minutes. This mass may be cooled to about room temperature and the factice readily milled in on either cold or slightly warm rolls. By first combining the fillers and polyisobutylene, the fillers appear to be more thoroughly wet and while I do not want to be limited to any particular theory, I have found that when the fillers are first thoroughly mixed with the polyisobutylene the sealing element is more water resistant and will retain higher carbonation pressures.

The compositions of my invention are flexible, compressible, tough, impermeable to gas and liquid and sufficiently free from tack to be commercially usable. Such compositions are particularly adapted as a lining material for use in closures for foods and beverages under pressure. Although these compositions have been disclosed and described with particular reference to lining materials for container closures, they may be employed for other purposes such as gaskets, and the term "sealing element" is generic to such uses.

The compositions may be applied to closures by several different methods. For example, the compositions may be calendered or duplexed, at proper thicknesses, to suitable backing material such as pulpboard or the like, which laminated materials are then applied to closures by the usual methods. The composition is also capable of being applied directly to the closure shell without any backing material either as a disc or in the form of a washer.

Having described my invention in detail, it is obvious that certain alterations may be made therein without departing from the spirit or scope of my invention as defined by the appended claims.

I claim:

1. A sealing element including a binder consisting of polyisobutylene having an average molecular weight of from about 70,000 to about 200,000 and factice, said factice being present in amount equal to from about 65% to 80% by weight of the total weight of factice and polyisobutylene, the sealing element being substantially devoid of cold flow under the conditions of use and being resilient.

2. A resilient, tack-free sealing element including a binder consisting of polyisobutylene having an average molecular weight of from about 70,000 to about 200,000 and factice, said factice being present in amount equal to from about 68% to 77% by weight of the total weight of factice and polyisobutylene, the sealing element being substantially devoid of cold flow under the conditions of use and being resilient.

3. A sealing element including a binder consisting of about 75% by weight of factice and about 25% by weight of polyisobutylene having an average molecular weight of about 150,000, the sealing element being substantially devoid of cold flow under the conditions of use and being resilient.

4. A sealing element consisting of polyisobutylene having an average molecular weight of from about 70,000 to about 200,000, factice, and filler, said factice being present in amount equal to from about 65% to 80% by weight of the total weight of factice and polyisobutylene, the sealing element being substantially devoid of cold flow under the conditions of use and being resilient.

5. A sealing element consisting of polyisobutylene having an average molecular weight of from about 70,000 to about 200,000, factice, and filler, said factice being present in amount equal to from about 68% to 77% by weight of the total weight of factice and polyisobutylene, the sealing element being substantially devoid of cold flow under the conditions of use and being resilient.

6. A sealing element consisting of about 24 parts by weight polyisobutylene having an average molecular weight of from about 70,000 to about 200,000, about 66 parts by weight of factice, and about 10 parts by weight of asbestine.

7. A sealing element consisting of about 28% by weight of polyisobutylene having an average molecular weight of from about 70,000 to about 200,000, about 70% by weight of factice, about 2% by weight of iron oxide.

8. A sealing element consisting of about 24% by weight of polyisobutylene having an average molecular weight of from about 70,000 to about 200,000; about 66% by weight of a gel of vulcanized siccative oil; and about 10% by weight of inorganic filler.

9. A method of combining polyisobutylene having an average molecular weight of from about 70,000 to about 200,000, factice, in an amount equal to from about 65% to 80% by weight of the total weight of polyisobutylene and factice, and filler, said method comprising the steps of first thoroughly kneading the filler and polyisobutylene at an elevated temperature of at least 70° C. to form a uniform mass, and then mixing said mass with factice.

10. A method of combining filler, polyisobutylene having an average molecular weight of about 150,000 and from about 65% to 80% by weight of factice based on the total weight of polyisobutylene and factice, said method comprising the steps of first thoroughly kneading the polyisobutylene and filler at an elevated temperature of at least 70° C. and then combining the factice with said other ingredients.

ELLIS GRAY KING.

REFERENCES CITED

The following references are of record in the file of this patent:

UNITED STATES PATENTS

| Number | Name | Date |
| --- | --- | --- |
| 2,090,708 | Stahl | Aug. 24, 1937 |
| 2,131,342 | Baldeschwieler | Sept. 27, 1938 |
| 2,235,536 | Savage | Mar. 18, 1941 |